US008896686B2

(12) United States Patent
Chen et al.

(10) Patent No.: US 8,896,686 B2
(45) Date of Patent: Nov. 25, 2014

(54) DETERMINING A GEOMETRIC PARAMETER FROM A SINGLE IMAGE

(75) Inventors: Xin Chen, Evanston, IL (US); Roger B. Hui, Northbrook, IL (US); Narayanan Alwar, South Barrington, IL (US)

(73) Assignee: HERE Global B.V., Veldhoven (NL)

( * ) Notice: Subject to any disclaimer, the term of this patent is extended or adjusted under 35 U.S.C. 154(b) by 1111 days.

(21) Appl. No.: 12/489,697

(22) Filed: Jun. 23, 2009

(65) Prior Publication Data

US 2010/0321490 A1  Dec. 23, 2010

(51) Int. Cl.
H04N 7/00 (2011.01)
H04N 7/18 (2006.01)
G06K 9/00 (2006.01)
G06F 7/00 (2006.01)
G06F 17/30 (2006.01)
G05B 19/04 (2006.01)
G05B 19/18 (2006.01)
G01C 11/00 (2006.01)
G01C 21/32 (2006.01)
G06T 7/60 (2006.01)

(52) U.S. Cl.
CPC ....... *G01C 11/00* (2013.01); *G06T 2207/10016* (2013.01); *G06T 2207/30256* (2013.01); *G01C 21/32* (2013.01); *G06T 7/602* (2013.01)
USPC ........... 348/118; 348/116; 382/100; 707/803; 700/253

(58) Field of Classification Search
CPC .................. G01C 11/00; G01C 21/32; G06T 2207/10016; G06T 2207/30256

USPC .......................................... 348/118
See application file for complete search history.

(56) References Cited

U.S. PATENT DOCUMENTS

| 5,073,819 | A | | 12/1991 | Gates et al. |
| 5,521,843 | A | * | 5/1996 | Hashima et al. ............... 700/253 |
| 5,790,403 | A | * | 8/1998 | Nakayama ....................... 701/28 |
| 6,477,260 | B1 | | 11/2002 | Shimomura |
| 6,990,253 | B2 | | 1/2006 | Takeda et al. |
| 7,405,746 | B2 | * | 7/2008 | Wakimoto et al. ............. 348/116 |
| 2009/0140887 | A1 | | 6/2009 | Breed et al. |
| 2009/0262974 | A1 | * | 10/2009 | Lithopoulos .................. 382/100 |
| 2010/0121886 | A1 | * | 5/2010 | Koshiba et al. ................ 707/803 |

OTHER PUBLICATIONS

Office Action in co-pending U.S. Appl. No. 12/489,737, dated Jan. 4, 2012.

* cited by examiner

*Primary Examiner* — Hee-Yong Kim
(74) *Attorney, Agent, or Firm* — Lempia Summerfield Katz LLC

(57) ABSTRACT

Systems, devices, features, and methods for determining a geometric parameter from an image are disclosed. For example, one method for determining the geometric parameter is used to develop a navigation database. The method comprises determining calibration values corresponding to a camera mounted on a vehicle or a pedestrian. A plurality of images of geographic features are captured by the camera. A single image from the plurality of images is identified or selected. A geometric parameter of a region in the single image is determined based on the determined calibration values. For example, the geometric parameter is a real-world distance, such as a real-world length or width.

19 Claims, 5 Drawing Sheets

DETERMINING A GEOMETRIC PARAMETER FROM A SINGLE IMAGE

REFERENCE TO RELATED APPLICATIONS

The present patent application is related to the patent application filed on the same date, Ser. No. 12/489,737, entitled "DETERMINING GEOGRAPHIC POSITION INFORMATION FROM A SINGLE IMAGE", the entire disclosure of which is incorporated by reference herein.

BACKGROUND OF THE INVENTION

The present invention relates to analyzing image data and, more particularly, to determining geometric parameters from a single image.

Geometric parameters, such as, for example, a length, a width, a height, and/or other parameters, of an object may be determined for a variety of applications and fields. For example, navigation systems or devices may use geometric parameter values of geographic objects to provide guidance and/or visual displays to end users. In one embodiment, a navigation system or device may provide realistic visual models of signs and other road features based on substantially accurate real-world geometric parameters of those signs and road features. Also, the navigation system or device may provide better route guidance, route calculation, safety features, and/or other navigation-related functions based on substantially accurate real-world geometric parameters, such as road lane widths.

Real-world geometric parameters, such as for road objects, may be determined by real-world measurements, such as by hired personnel. However, real-world measurements for multiple geographic features may be time consuming and costly if not impractical or improbable. Some systems may use multiple cameras to focus on a geographic feature, and correspondence calculations between the cameras are used to determine geometric parameters of the geographic feature. Also, multiple images of the same geographic feature may be used to determine geometric parameters, such as by triangulation. However, the use of multiple cameras and/or multiple images to estimate geometric parameters for a geographic object may involve increased complexity, time, and cost.

SUMMARY OF THE INVENTION

According to one aspect, a method of determining a real-world parameter of an object in an image is disclosed. For example, the method comprises determining calibration values relating to a camera. The camera captures an image at the determined calibration values. A first point in the image is identified. A second point in the image is identified. The first point and the second point correspond to endpoints of an object in the image. A distance between the first point and the second point in the image is determined based on the determined calibration values. The distance corresponds to a real-world length or a real-world width of the object in the image.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Figure 1:
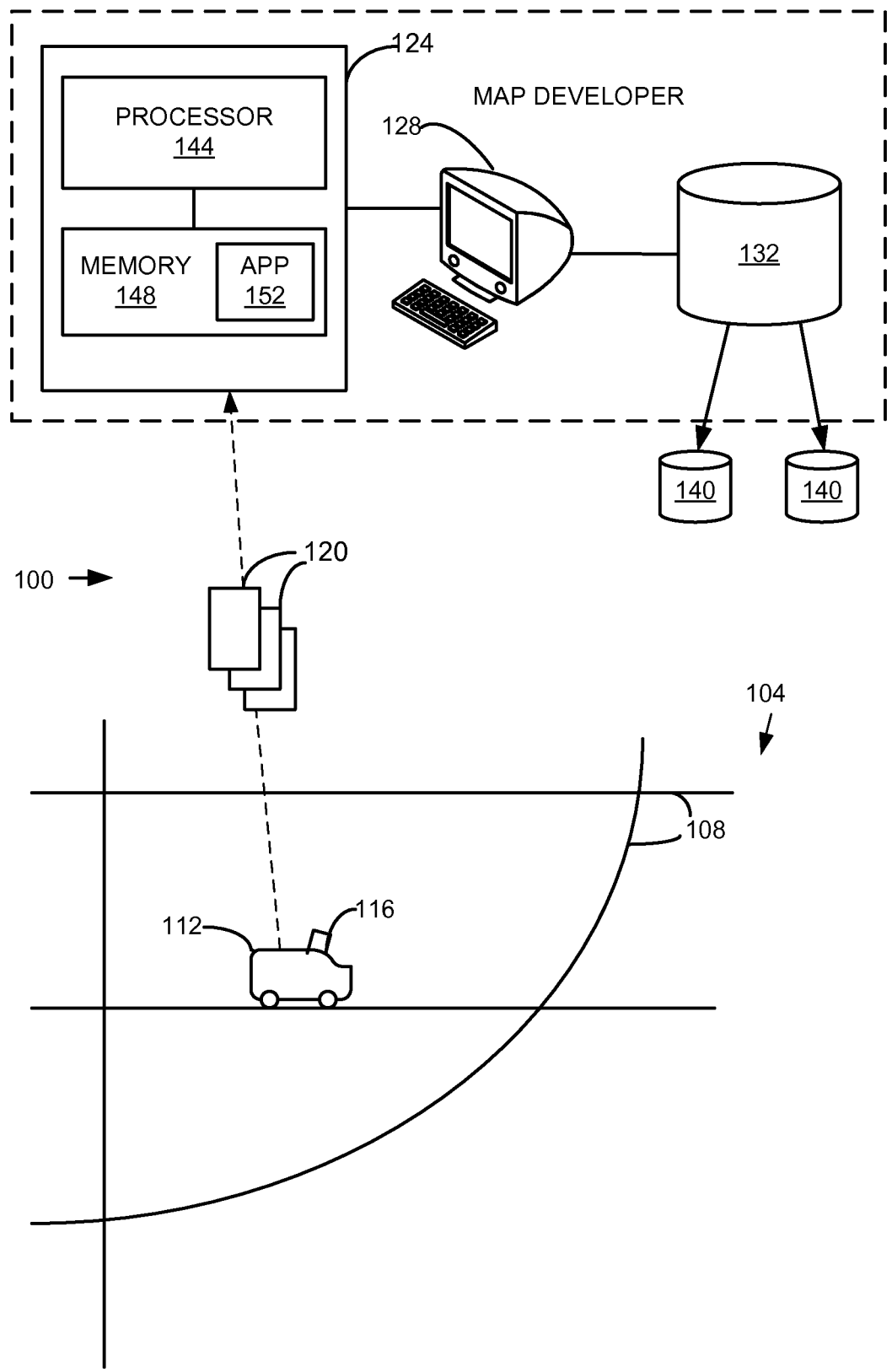
FIG. 1 is a diagram of a system for determining a geometric parameter from a single image to develop a navigation database.

FIG. 1 shows one embodiment of a system 100 for determining a geometric parameter from a single image to develop a navigation database. The system 100 includes, but is not limited to, an object 112 travelling on a path network 108 in a geographic region 104, a processing device 124, a user interface or work station 128, and a geographic, map, navigation, and/or navigation-related database 132. Additional, fewer, or different components may be provided.

The object 112 is a vehicle, such as a car, truck, motorcycle, bicycle, Segway, or other transportation device or mechanical device used to move on the path network 108. Alternatively, the object 112 may represent a pedestrian, such as a human being or animal, that walks or moves along the path network 108. The path network 108 is a road network and/or a collection of other pathways. For example, the path network 108 is a road network made up of various roads. The roads may be used to drive vehicles on, such as local and neighborhood streets as well as highways. Also, instead of or in addition to traditional streets, the path network 108 may include bicycle roads or paths, walking paths, or other travel paths. The path network 108 is in a geographic region 104, such as a city, a suburb, a state, a country, and/or other geographic region.

The object 112 travels along or moves about the path network 108 to collect data associated with one or more paths or roads of the path network 108. For example, a supporting device or housing 116 is attached or connected with or carried by the object 112. The supporting device 116 may be or may include equipment to collect data representing an area about or around a road or path. For example, the collected data may be imagery or video/camera data (such as in the visible spectrum or other spectrum). In one embodiment, the supporting device 116 is a housing or container that is attached to a vehicle, and as the vehicle is on and/or moving on a road, equipment, such as a video and/or photograph camera, in the supporting device 116 collects or gathers data corresponding to the surrounding area. Alternatively, the supporting device 116 may be the camera itself or parts thereof. The supporting device 116 may be positioned at a frontend of the vehicle and may be angled to enhance collection. In other embodiments, the supporting device 116 may be positioned any place on the vehicle and in any direction.

The collected data is stored on one or more computer-readable media 120, such as a CD-ROM, DVD, flash drive, hard drive, or other tangible media suitable to store data. Different types of data may be stored on the same medium 120. Alternatively, separate media 120 may be used to store separate or different types of data. In one embodiment, photographs (such as digital or electronic photographs), video images, and/or other image data collected by the object 112 is stored in one or more media 120. Alternatively, the media 120 may be signals carrying or having image data. The collected image data or images may represent areas or regions about or around a path or road. The collected images may include geographic features, such as road or path markings, road or path signs, points-of-interest ("POIs"), and other features or objects.

The collected image data, via one or more media 120, is sent to a map, geographic, and/or navigation data developer, such as NAVTEQ North America, LLC located in Chicago, Ill. For example, a medium 120 may be mailed to or brought to the map developer. Alternatively, some or all of the collected data may be transmitted to the map developer via a wireless and/or wired network. For example, the network may include the Internet, an intranet, a local area network ("LAN"), a wide area network ("WAN"), a virtual private network ("VPN"), a server network, a cellular network, a satellite network, a broadcasting network, a wireless or wired connection, and/or any known or future network or connection. The term "map developer" may also include third-party contractors.

The processing device 124 maintained by the map developer receives the collected image data, via the medium 120 or other means. The processing device 124 is one or more computers (such as a desktop tower or a laptop processing unit), processors, or other electronic processing systems or devices. The user interface or workstation 128 includes a display and input devices (such as a keyboard, mouse, voice recognition circuit, or other input device) that are associated with the processing device 124. In one embodiment, the processing device 124 and the user interface 128 are part of the same computer system or workstation. In another embodiment, the processing device 124 and the user interface or workstation 128 are separate computers. For example, the processing device 124 may be a server and the workstation 128 may be a separate computer in communication with the server 124.

The processing device 124 includes, but is not limited to, a processor 144, a memory 148, and a geometric parameter software application 152. The processor 144 is a general processor, application-specific integrated circuit ("ASIC"), digital signal processor, field programmable gate array ("FPGA"), digital circuit, analog circuit, or combinations thereof. The processor 144 is one or more processors operable to control and/or communicate with the various electronics and logic of the processing device 124 and/or the user interface or workstation 128. The memory 148 is any known or future storage device. The memory 148 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 148 may be part of the processor 144. The memory 148 is operable or configured to store collected image data and/or other data.

The processor 144 is configured or adapted to execute the geometric parameter software application 152, which may be stored in the memory 148 or other memory. For example, the geometric parameter software application calculates or determines geometric parameters in or from images. In one embodiment, a single image may be displayed on the user interface 128, and a user (such as an employee of the map developer) may select an area, object, or geographic feature in the image to determine geometric parameters, such as a length, width, and/or height, of the object or feature from the single image. Geometric parameters of road or path features, such as dimensional data of lanes, road or path markings, signs, POIs, and/or other objects, may be used to enhance or develop the navigation database 132. For example, the determined geometric parameters may be stored with or associated with existing navigation or map-related data of the master database 132.

In one embodiment, the geographic database 132 includes data used for navigation-related services. For example, the geographic database 132 contains road segment and node data records that represent a road network, such as the path network 108. A node represents an end point of a road segment. The road segments and nodes may be associated with attributes, such as geographic coordinates, street names, address ranges, speed limits, turn restrictions at intersections, and other vehicle navigation attributes, as well as POIs, such as gasoline stations, hotels, restaurants, museums, stadiums, offices, automobile dealerships, auto repair shops, buildings, stores, etc. Alternatively, the geographic database 132 contains path segment and node data records or other data that represent pedestrian paths in addition to or instead of the vehicle road record data.

The geographic database 132 may be a master geographic database that is stored in a format that facilitates updating, maintenance, and development. For example, the master geographic database 132 or data in the master geographic database 132 is in an Oracle spatial format, such as for development or production purposes. The Oracle spatial format or development/production database may be compiled into a delivery format, such as a GDF format. The data in the production and/or delivery formats may be compiled or further compiled to form geographic database products or databases 140, which may be used in end user navigation devices or systems.

For example, geographic data is compiled (such as into a PSF format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation.

When storing the geometric parameters determined by the processing device 124 and applications thereof, the determined geometric parameters may be associated with or included in specific road or path segment records, node records, an index, or other data structures. For example, determined geometric parameters for a road sign or a road lane may be stored in or linked with a road segment record associated with the actual portion of the real-world road that includes the road sign or the lane. Accordingly, when data corresponding to the road segment record is accessed, such as by a navigation system or a modeling device, the determined geometric parameters are accessed for navigation-related services, modeling, or other purposes.

Figure 2:
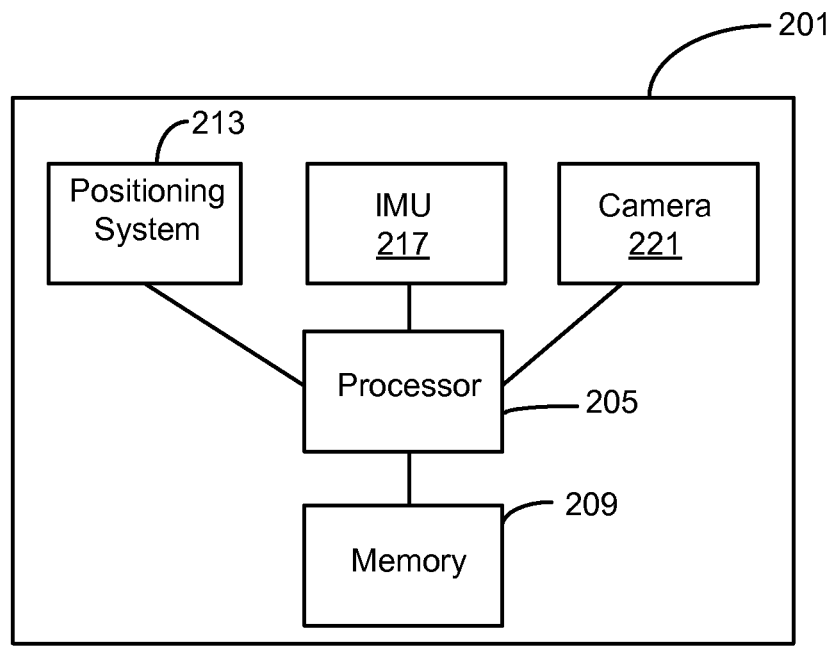
FIG. 2 illustrates components of a device that may be used in the system of FIG. 1.

FIG. 2 illustrates components of a device 201 used in the system 100. For example, the device 201 may be an embodiment of the object 112, such as a vehicle, or may be similar to the supporting device 116. In one embodiment, the device 201 is a support or housing that includes equipment to collect image data. For example, the device 201 is removably or integrally attached or connected to a vehicle. The device 201 is positioned at a top frontend of the vehicle. Alternatively, the device 201 may be positioned on or in any part of the vehicle at any angle.

The device 201 includes, but is not limited to, a processor 205, a memory 209, a positioning system 213, an inertial measurement unit ("IMU") 217, and a camera system or device 221. Additional, fewer, or different components may be provided. For example, an input device may be provided. The input device may be one or more buttons, keypad, keyboard, mouse, stylist pen, trackball, rocker switch, touch pad, voice recognition circuit, or other device or component for controlling or inputting data in one or more of the components of the device 201. Also, laser devices, such as one or more Light Detection and Ranging ("LIDAR") devices, may be provided. While the components in FIG. 2 are shown as separate from one another, one or more of these components may be combined. Also, some of the components may be provided outside of the device 201. For example, if the device 201 is a housing attached to a vehicle, the positioning system 213, the processor 205, the memory 209, an input device, and/or other components may be in the vehicle or another part of the vehicle while the camera system or device 221 is in the device 201.

The processor 205 is a general processor, application-specific integrated circuit ("ASIC"), digital signal processor, field programmable gate array ("FPGA"), digital circuit, analog circuit, or combinations thereof. The processor 205 is one or more processors operable to control and/or communicate with the various electronics and logic of the device 201. The processor 205 is configured to operate the collection equipment, such as the positioning system 213, the IMU 217, and the camera system or device 221. For example, the processor 205 sends commands to the various collection devices to collect data and synchronizes or manages the different components. Also, the processor 205 is configured to associate and store data from the collection devices into the memory 209.

The memory 209 is any known or future storage device. The memory 209 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 209 may be part of the processor 205. The memory 209 is operable or configured to store collected image data and/or other data. The memory 209 may be part of the computer-readable medium 120 or may be a separate memory.

The positioning system 213 is a global positioning system ("GPS"), one or more mechanical and/or electrical sensors, one or more gyroscopes, a local positioning system, one or more direction sensors, or other system or device for providing position data, such as location data (e.g., longitude, latitude, altitude, and/or other coordinates) and/or direction data, of the device 201, components thereof, or an attached object, such as a vehicle. The IMU 217 may be part of or separate from the positioning system 213. The IMU 217 may include one or more accelerometers, gyroscopes, and/or other components. The IMU 217 detects current rate of acceleration as well as changes in rotational attributes, such as pitch, roll, and yaw. Data from the IMU 217 may be used for error corrections, data compensation, and other purposes.

The camera system 221 includes one or more cameras used for taking pictures or videos of a surrounding area. For example, the camera system 221 includes a video camera that records video data (such as in the visible light spectrum or other spectrum) representing geographic features of and about a road or path as a vehicle drives along the road or path. The camera system 221 may also capture still photographs separate from the video data. The camera system 221 is able to capture different colors and associated text of geographic features. In one embodiment, at most one camera is used to collect or capture images for determining geometric parameters of geographic features.

Figure 3:
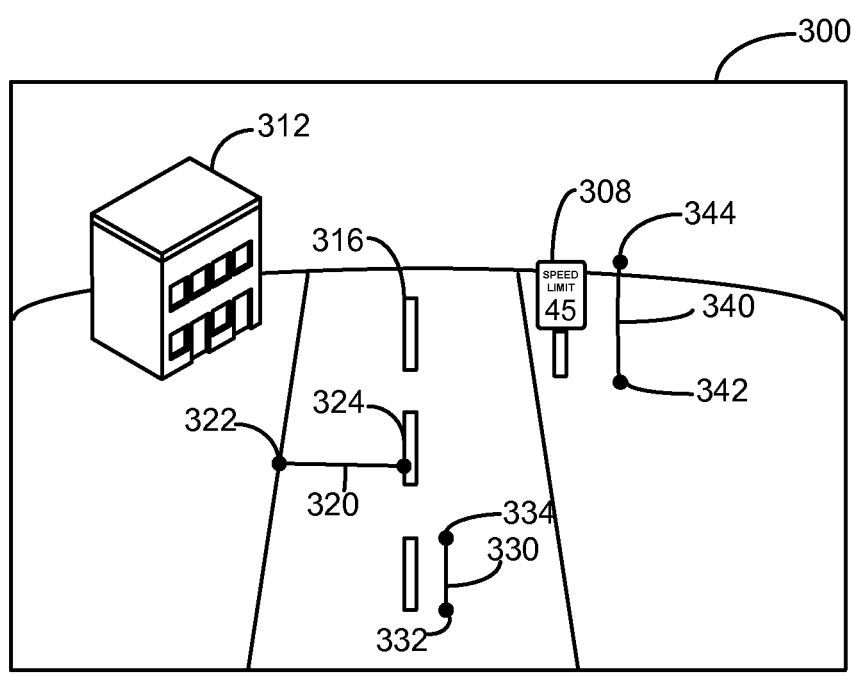
FIG. 3 is an embodiment of an image that illustrates geometric parameters that can be determined.

FIG. 3 is an embodiment of an image 300 that illustrates geometric parameters that can be determined. The image 300 is in a bitmap, JPEG, GIF, and/or other image format. In one embodiment, the image 300 is a single image of a plurality of images captured by the camera device 221 or other camera while driving along the road represented in the image 300. The image 300 is stored, such as in a medium 120, and then sent to the map developer. The image 300 is displayed, such as on the user interface 128. In one embodiment, a user and/or map developer employee views the image 300. The image 300 includes image representations of a POI 312 (such as a building or structure), a road 304, a road sign 308 (such as a SPEED LIMIT sign or other sign), and other geographic features. The road 304 includes markings 316, such as lane markings or other road markings.

The user may select points, areas, objects, or regions in the image 300 to retrieve or obtain geometric parameters corresponding to the selected points, areas, objects, or regions. The geometric parameters may be a real-world width, length, height, and/or other distance of an object, feature, or portion thereof in the image 300. For example, if the user wants to know the real-world width between the edge or curb of the road 304 and a middle lane marking 316, the user can select an endpoint 322 and an endpoint 324 to determine the value of the distance 320. Alternatively, the user may draw in the line segment 320 to obtain the width measurement. The processing device 124, using the geometric parameter software application 152, determines or calculates the real-world distance or measurement of the selected width from the single image 300. For example, the measurement value may be in meters, feet, inches, or any other unit. The determined width value may be displayed over or on the image 300, in a separate window or screen. Alternatively, the width value may be stored in a data file.

Similarly, other geometric parameters may be determined. For example, the user may want to know a length of one of the lane markings 316. Accordingly, the user selects or creates end points 332 and 334 and/or selects or draws line segment 330. Furthermore, the user selects or creates end points 342 and 344 and/or selects or draws line segment 340 to obtain a height value or measurement of the sign 308 (e.g., an option may be provided to choose a height calculation rather than a ground calculation between points). Based on the selections or markings, the processing device 124, using the geometric parameter software application 152, determines or calculates the respective geometric parameters from the single image 300. The determined geometric parameters may be displayed and are stored, linked, or associated with the geographic database 132 and/or data thereof. The selection of geographic objects or portions thereof in the image 300 may be made via a touch screen display, an input device (such as a keyboard or mouse), or other means. The selections, markings, or inputs may be made anywhere in the image 300.

Figure 4:
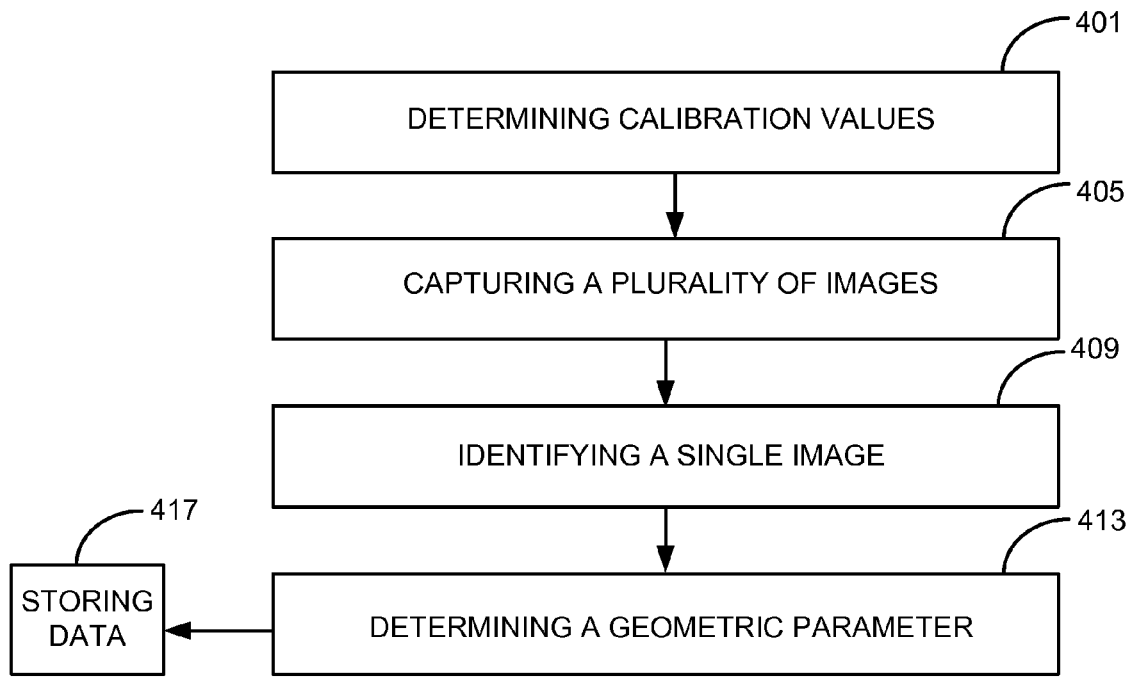
FIG. 4 is a flowchart of a method for determining a geometric parameter from a single image, such as the image of FIG. 3.

FIG. 4 is a flowchart of a method for determining a geometric parameter from a single image, such as the image 300. Fewer or more steps or acts may be provided, and a combination of steps may be provided. Also, the steps or acts may be performed in the order as shown or in a different order. The method is implemented by the system and/or devices described herein or by different devices or systems.

Calibration values of a camera, such as the camera 221, are determined or calculated (Step 401). For example, the map developer or associated computer, entity, and/or person thereof determines calibration values associated or corresponding to a camera used to capture images to determine geometric parameters, such as a camera mounted on a data collection vehicle of the map developer. The calibration values may include intrinsic and/or extrinsic parameters relating to the camera. Intrinsic parameters include focal length, an angle between a horizontal axis and vertical axis of an image, and/or other parameters. Extrinsic parameters may specify the location and orientation of the camera. For example, extrinsic parameters may include camera roll, pitch, yaw, elevation above a plane, and/or other parameters.

In one embodiment, to simplify and/or minimize the number of intrinsic and extrinsic parameters to determine, the map developer may take some steps or estimations regarding some of the parameters. For example, regarding intrinsic parameters, the map developer may assume that the angle between the horizontal axis and the vertical axis of the image to be about 90° and that the origin point is the center of the image. Regarding, extrinsic parameters, the map developer may define the vanishing direction in the image by finding a vanishing point (intersection of two parallel lines in the image) to reduce the extrinsic parameters to be determined to two, i.e., the camera roll angle about the vanishing direction and the elevation, which may be implicit in a scaling factor. The scaling factor may be determined, such as in a last or final step, by taking a measurement in the real-world coordinate system. Accordingly, the map developer focuses on determining the focal length parameter ($\alpha$) and the camera roll angle ($\phi$) for determining geometric parameters from a single image. More or less parameters may be focused on for determination.

Figure 6:
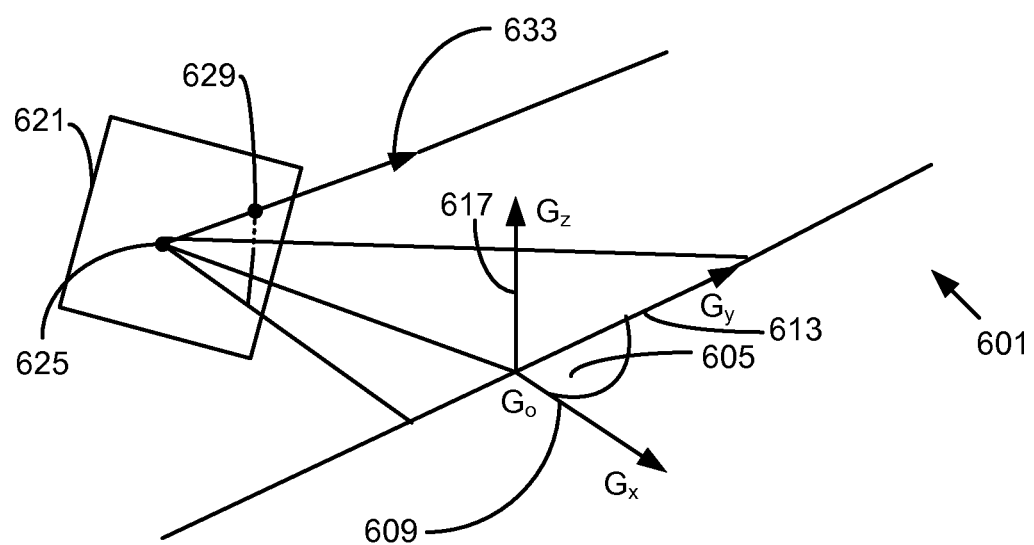
FIG. 6 illustrates a relationship between an image plane and a ground plane used in the system of FIG. 1 and/or in the associated methods.

FIG. 6 illustrates a relationship between an image plane 621 and a ground plane 605 relating to modeling and/or determining the calibration values, such as the focal length parameter ($\alpha$) and the camera roll angle ($\phi$), as well as relating to determining geometric parameters from a single image, such as the image 300. For example, point 625 is a center of projection, and the point 629 is the vanishing point in the image. A three-dimensional ground coordinate system is projected from the image plane 621. The ground coordinate system includes a z-axis 617 ($G_z$), a x-axis 609 ($G_x$), and a y-axis 613 ($G_y$). The plane between the x-axis and the y-axis is the ground plane 605. Also, the y-axis 613 is parallel to a vanishing direction 633 of the image plane.

The x-axis 609 may be modeled as:

$$G_x = \begin{bmatrix} (1-\alpha v_x^2)\cos\varphi + \alpha v_x v_z \sin\varphi \\ v_z \sin\varphi - v_x \cos\varphi - \\ (1-\alpha v_z^2)\sin\varphi - \alpha v_x v_z \cos\varphi \end{bmatrix}^T$$

wherein T indicates transpose Also, a normalzed vanishing direction is modeled as [$v_x$, $v_y$, $v_z$]. Furthermore, the focal length may be characterized as $\alpha=1/(1+v_y)$.

The z-axis 617 may be modeled as:

$$G_z = \begin{bmatrix} (1-\alpha v_x^2)\sin\varphi - \alpha v_x v_z \cos\varphi - \\ v_x \sin\varphi - v_z \cos\varphi \\ (1-\alpha v_z^2)\cos\varphi - \alpha v_x v_z \sin\varphi \end{bmatrix}^T$$

The y-axis 613 coincides with the vanishing direction 633 that may be computed as $A^{-1}x$, where x is the vanishing point 629 and A is the camera intrinsic parameters matrix:

$$A = \begin{bmatrix} \alpha_u & -\alpha_u \cot\theta & u_0 \\ 0 & \frac{\alpha_v}{\sin\theta} & v_0 \\ 0 & 0 & 1 \end{bmatrix}$$

wherein $\alpha_u$ is the horizontal component of the focal length and $\alpha_v$ is the vertical component of the focal length. The coordinates $u_0$ and $v_0$ are the origin point or the center of the image. Also, $\theta$ is the angle between the horizontal axis and the vertical axis of the image, which may be about 90°.

Using the above equations and/or relationships, projections of image points, such as of the image 300, onto the ground plane 605 may be computed. For example, given an image point x, $p=A^{-1}x$ is a vector in the direction of a ray from the camera center through x. One can solve for the intersection of this ray and the ground plane 605 to obtain $$P = \frac{G_{z2}}{\hat{p} \cdot G_z} \hat{p},$$

where $G_{z2}$ is the second element of $G_z$ and $$\hat{p} = \frac{p}{\|p\|}.$$

P being a point on the ground plane 605 that corresponds to an image point in the image plane 621. For example, if x is the point 324 on a lane marking in the image 300 of FIG. 3, then P is the projection of the point 324 on the ground plane 605. Accordingly, given two projection points, P1 and P2, on the ground plane 605, a distance between them is $\|P_1-P_2\|$. One can also compute the distance between P1 and P2 along the direction of the x-axis 609 and the y-axis 613 as:

$|(P_1-P_2)\cdot G_x|$ and $|(P_1-P_2)\cdot G_y|$.

Accordingly, real-world distances, such as ground distances, may be calculated or determined from a single image, such as the image 300.

Understanding the relationship between the calibration values and the ground coordinate system, the map developer may determine or calculate appropriate calibration values (the focal length parameter ($\alpha$) and the camera roll angle ($\phi$)), such as by using a ground truth method. For example, the camera used on the map developer's vehicle has a substantially fixed focal length, and the focal length may be determined, such as offline or at any other time. In one embodiment, the calibrated value of the focal length may be $\alpha_u=1833.35507$ and $\alpha_v=1822.48858$. Other values may be used.

Figure 7:
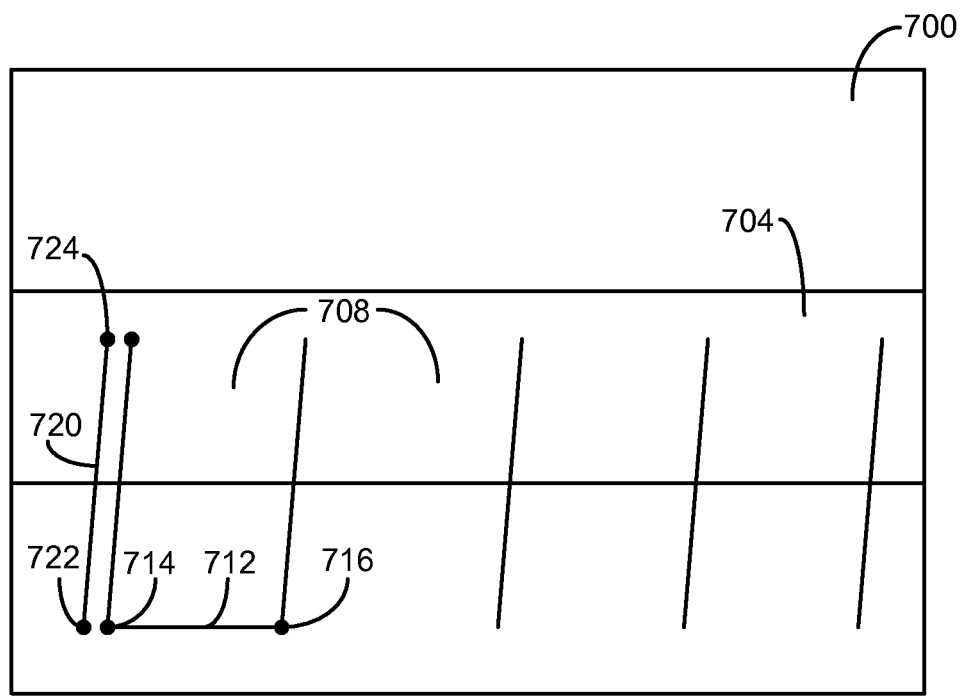
FIG. 7 is an embodiment of an image used for calculating calibration values used in the system of FIG. 1 and/or in the associated methods.

To determine the camera roll angle, a comparison between real-world measurements and computed or calculated measurements may be used. For example, FIG. 7 is an embodiment of an image 700 used for calculating calibration values. The image 700 is taken or captured by the camera in a certain position on the vehicle of the map developer. The image 700 includes representations of a parking lot 704 having parking spaces 708. The map developer may physically measure a width 712 of a parking space 708 using a ruler or other measurement device at the real-world parking lot. Also, the map developer may physically measure a length 720 of the parking space 708 using the ruler or other measurement device. Then, the map developer may calculate the width 712 and the length 720 using the image 700. For example, a user of a computing device, such as the processing device 124 and/or the user interface 128, may select a point 714 and a point 716 to calculate the ground distance 712 based on the equations above. Also, the user may select a point 722 and a point 724 to calculate the ground distance 720. The calculated distances 712 and 720 are based on the calibrated focal length value and an initial or test camera roll angle value.

The calculated ground distances are compared to the actual measured ground distances, and the map developer can finely tune the camera roll angle value until the measured values substantially match the computed values. For example, a residual, r, is minimized using:

$$r = \sum_{i=1}^{n} \left( \frac{d_i m_0}{d_0 m_i} - 1 \right)^2$$

Wherein m are the measured distances and d are the computed distances. The camera roll angle value that produces the least difference between the measured and computed values is used as the calibrated value. Accordingly, the calibrated values of the focal length parameter ($\alpha$) and the camera roll angle ($\phi$) are determined for the camera, such as the camera mounted on the map developer vehicle.

Referring back to FIG. 4, a plurality of images of geographic features are captured by the camera, such as by the calibrated camera system 221 (Step 405). For example, the map developer employs a driver to drive a vehicle, such as the object 112, on one or more roads to collect data to develop the map database 132. In one embodiment, image data, such as photographs and/or videos, of geographic features or areas about roads or paths are collected. Other data including positioning information or data, such a GPS data (e.g., latitude, longitude, and/or altitude) corresponding to the vehicle or data collection devices supported by the vehicle are collected. In an alternate embodiment, instead of or in addition to driving or riding a vehicle to collect images, a pedestrian may use a supporting device, such as the device 116 or 201, to collect the image data and/or other data. For example, a pedestrian carries or puts on a backpack or other transportation device (which may support the device 116 or 201) while walking on a path to collect data corresponding to the path.

The captured or collected images and/or other data are sent to a map developer. In one embodiment, the image data is associated with position data and/or other data, and all the data is sent in the same data file. Or, different data is sent separately with links or indicators associating the different data with each other. In one embodiment, images, such as the image 300, are stored on a computer-readable medium, such as the medium 120, and other collected data are stored on different media. Alternatively, different types of collected data may be stored on the same computer-readable medium. The computer-readable media are delivered to an office or facility of the map developer. For example, after a vehicle is finished collecting data, it returns to a facility of the map developer. Or, the media may be mailed or sent by carrier to a certain office or facility. Alternatively, the collected data is transmitted to the map developer via a wireless or wired network.

The images and/or other data are received by a processing device of the map developer, such as the processing device 124. In one embodiment, one or a single image is identified or selected from the plurality of captured images (Step 409). For example, image data files of the collected images are configured to be displayed on a user interface, such as the user interface 128. A user may select one of the image data files to display the associated image, such as the image 300, on a display. Alternatively, multiple images may be selected to be displayed in separate windows on the same screen or different screen shots. The user may select an image based on an identification indicator or other reason. For example, an algorithm may detect that a certain image includes a desired geographic feature, and the user may select that image for display. Alternatively, the processing device 124 and/or the user interface 128 may automatically display one or more images based on desired detection, indicators, predetermined factors, and/or conditions.

Figure 5:
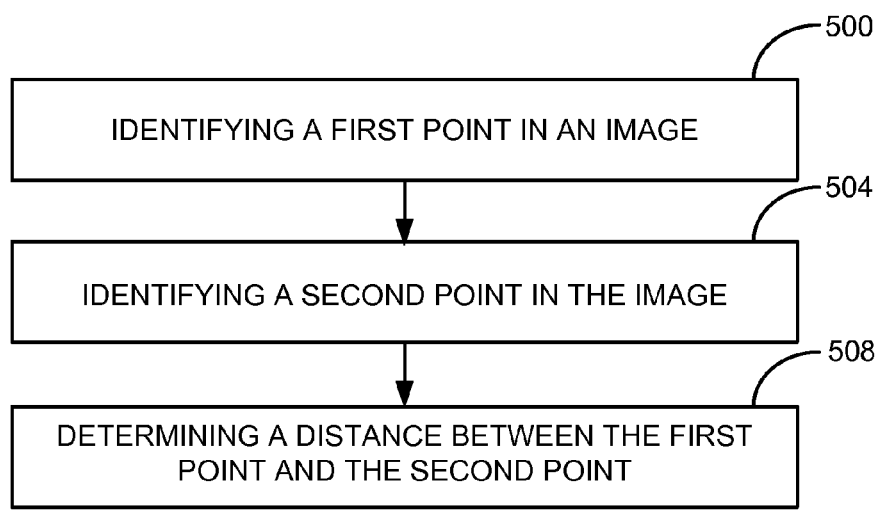
FIG. 5 is a flowchart of one embodiment of a step of the method of FIG. 4.

If multiple images are displayed on one or more screens or windows or if one image is displayed, one or more geometric parameters are determined from or based on a single image (Step 413). FIG. 5 is a flowchart of one embodiment of determining geometric parameters from a single image. Fewer or more steps or acts may be provided, and a combination of steps may be provided. Also, the steps or acts may be performed in the order as shown or in a different order. The method is implemented by the system and/or devices described herein or by different devices or systems.

For example, an image, such as the image 300, is displayed. A first point, such as the point 332 in the image 300, is identified or selected (Step 500). A user or developer may use a mouse, keyboard, or other input device to select the first point. The first point may correspond to an edge, boundary point, or other portion of a geographic feature, such as a road or path sign, a road or path marking, a POI, or other feature or object in an image. The first point may be selected to be on or next to the geographic feature. For example, the point 332 corresponds to a bottom end of a lane marking on a road.

A second point, such as the point 334 in the image 300, is identified or selected (Step 504). The user or developer may use the input device to select the second point. The second point may correspond to another edge, boundary, or portion of the geographic feature. The second point may be selected to be on or next to the geographic feature. For example, the point 334 corresponds to a top end of the lane marking on the road. The selection or identification of the points correspond to a desired distance, such as the distance 330. Also, instead of or in addition to selected points, a user may draw or select a line over or by an object. The distance 330 corresponds to a length of the lane marking that the map developer may want to know to enhance the navigation database 132. Other geometric parameters, such as widths, heights, and/or other distances, of different geographic objects may be also selected.

A distance, such as a real-world distance, between the first point and the second point is determined (Step 508). For example, the identified or selected first and second points in the image are in an image plane, such as the image plane 621. Using the equations and mathematical relationships discussed above, corresponding ground points on a ground plane, such as the ground plane 605, are determined. Then, using the determined calibration values, a ground distance value may be calculated. For example, the processor 144 identifies the determined calibration values to compute a real-world ground distance corresponding to the selected geometric parameter, such as the length of the lane marking. Also, error correction or compensation may be performed to obtain more accurate distance values based on collected data, such as data collected by the IMU 217. The distance value may be in meters, feet, inches, centimeters, or any other unit. The determined value may be displayed on or over the image or in a separate window or screen. Or, in addition to or instead of being displayed in association with the image, the determined value may be saved in a data file that may be accessed at the present or later time. Accordingly, real-world geometric parameters may be calculated or determined based on calibration values from a single image (e.g., no images other than the single image are used in conjunction with the calibration values). For example, multiple cameras and/or multiple images and correspondence or triangulation between them (such as in a stereo method) are not used to determine geometric parameters, such as length or width, of geographic features.

Regarding, height or vertical calculations or determinations of geographic features in an image, additional steps or methods may be utilized. For example, the equations and techniques above focus on determining points on a ground plane from projections from an image plane. Therefore, height or vertical determinations may use incremental techniques to estimate or calculate height values. In one embodiment, if a user selects a height distance, such as the distance 340 in the image 300, the processing device 124 may first determine the ground point in the ground plane (such as the ground point corresponding to the point 342 associated with a bottom of the road sign 308). Then a vertical distance in the ground plane may be incrementally computed. For example, after the ground point is determined, a predetermined vertical distance is added. Then that line segment is projected from the three-dimensional ground coordinate system back into the image plane to determine if the line segment matches the line or distance (such as the line 340) selected in the image 300. If the line segment is too short, then the line segment is extended and a similar comparison as before is done. This process occurs incrementally until the height distance in the ground coordinate system matches the height in the image plane.

Using the techniques above, actual comparison data between ground truth values and computed values have been obtained. Data about ground distances, such as ground distances in a parking lot, are provided in Table 1. Data about height distances, such as heights from a ground point in the parking lot, are provided in Table 2.

TABLE 1

Comparison of Ground Truth and Calculated Distance

| Ground Truth | Number of measurement | Standard Error |
| --- | --- | --- |
| 48 inch ruler | 10 | 1.08 inch |
| 60 inch ruler | 5 | 1.50 inch |

TABLE 2

Comparison of Ground Truth and Calculated Height

| Ground Truth | Number of measurement | Standard Error |
| --- | --- | --- |
| 48 inch ruler | 5 | 0.66 inch |

Referring back to FIG. 4, after one or more of the geometric parameters, such as real-world distances including lengths, widths, and/or heights of geographic features, are determined from respective single images, the geometric parameters are stored (Step 417). For example, a determined geometric parameter may be stored in a road or path segment or node record that represents that real-world portion of the road, path, or area that includes the geographic feature corresponding to the determined geometric parameter. Accordingly, the determined geometric parameter may be an attribute associated with a path or road segment or other map data structure (e.g., of the map database 132) and is used for map display, map guidance, and/or other navigation related features. Alternatively, the determined geometric parameter may be stored separately from path/road segment or node records (e.g., an index may be used to associate or link determined geometric parameters with appropriate nodes, segments, and/or other map data structures or layers). Also, the determined geometric parameters may be stored in a database separate from the navigation database 132.

The different steps, acts, or processes of the methods described herein may be mixed and matched. Also, the methods mentioned herein may be implemented by a computer application, such as the geometric parameter software application 152, that is executed by one or more processors, such as the processor 144.

Alternatives

As mentioned above, the processing of the collected image data and/or other data may occur in a processing device at a map developer facility. Alternatively, some or all of the processing of the collected data may occur in the object collecting the data or components thereof, such as the vehicle or collection devices supporting the vehicle. Semi-processed or full processed data may then be sent to or transmitted to the map developer for further processing and/or storage in the map database.

As described above, the determined geometric parameters of geographic features from an image are stored in a map database and may be used for navigation related functions or services. However, the generated or determined geometric parameters may also be used for other applications. For example, the geometric parameter values may be used for video games, virtual reality applications, computer graphics programs, city modeling and/or other map, geographic, or location based applications.

Regarding the ordering of method steps, the description above explains the determination of calibration values before collecting images about roads or paths by the map developer. However, the determination of the calibration values may occur after image data has been collected by the vehicle or pedestrian of the map developer. Also, one of the images collected along a path or road may be used as a reference image to determine the calibration values.

Furthermore, as described above, a user or map developer selects points or distances in a displayed image to determine the distance value or parameter value of a geographic object in the image. However, automatic selections may be made. For example, recognition software may be used to detect signs or road features, and based on detection, automatic selections, such as endpoints or line segments, of regions may be provided. Accordingly, geometric parameters of geographic objects in image data may be determined without displaying the image to a user.

Also, as mentioned above, one or more calibration values, such as the camera roll angle, are determined based on a comparison between measured distances and computed distances. In an alternate embodiment, a calibration value may be determined without using ground truth or physical measurements. For example, a geometric parameter, such as a width, of a lane or road object in an image may be estimated based on a standard size constraint or requirement (such as provided by a government entity). Also, another object in the image may be used as a key scale. For example, a width or length of a vehicle or object in the image may be known (e.g., dimensions of a vehicle may be found in a specification sheet), and one can use this information to estimate a distance value of another object in the same image. Accordingly, the calibration value may be determined based on comparing these estimations from the image (rather than physical measurements) with the computed values.

Figure 8:
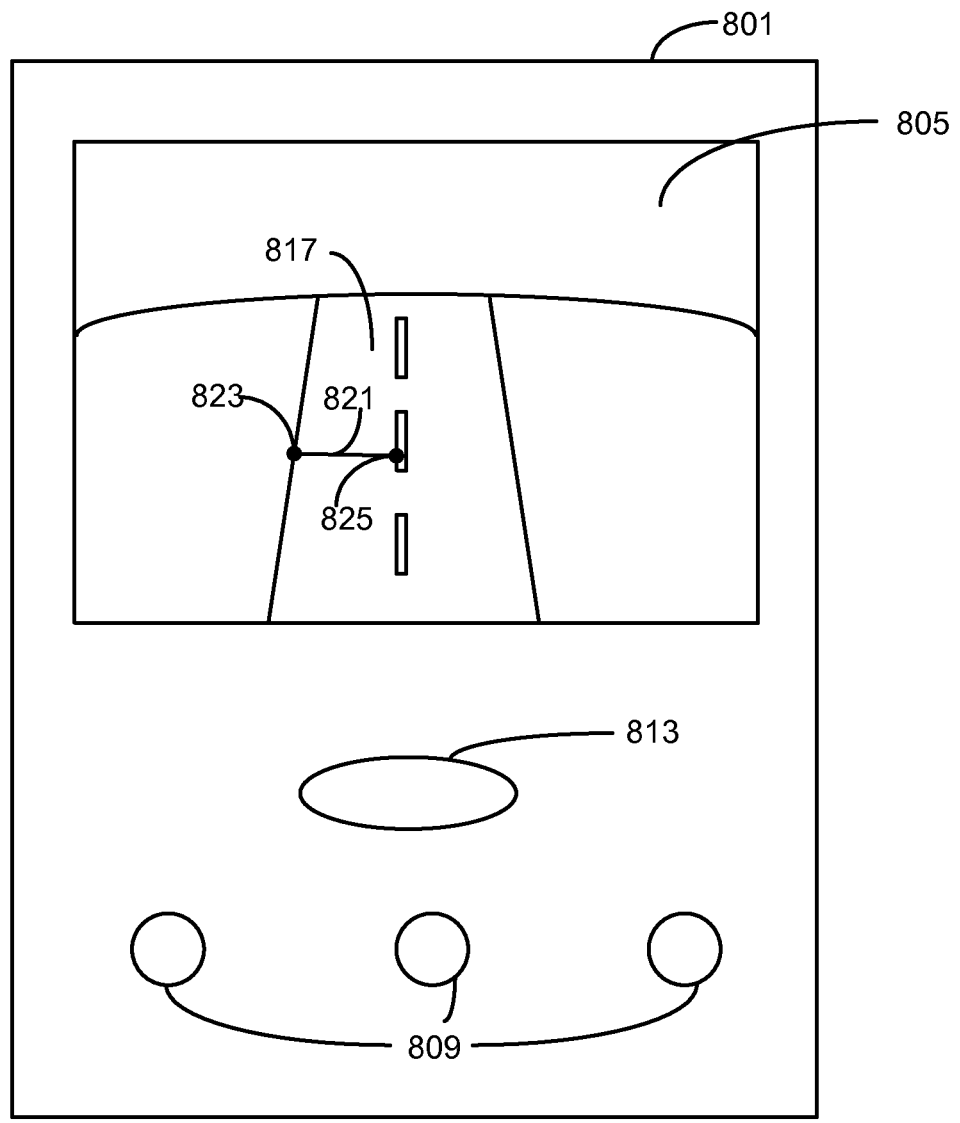
FIG. 8 is an alternate device for determining a geometric parameter from a single image.

FIG. 8 shows an alternate device 801 for determining a geometric parameter from a single image. For example, the device 801 is a cellular phone, mobile phone, smart phone, personal digital assistant ("PDA"), handheld computer, a watch, a camera, a personal navigation device ("PND"), a portable navigation device, and/or any other electronic device. For example, the device 801 is a cellular telephone or smart phone, such as a cell or smart phone provided by Nokia Corporation located in Espoo, Finland. The device 801 includes a display 805, a navigation button 813, and input buttons 809. More or fewer components may be provided. For example, a camera and other audio/visual components may be provided.

In one embodiment, an end user separate from the map developer may receive one or more images captured by the map developer for developing the map database. For example, pictures or images of famous roads, sites, areas, etc. may be desirable to an end user. The end user or the device 801 may also receive the determined calibration values that are associated with the camera that took the pictures or images. The device 801 includes or executes a geometric parameter software application, such as the application 152, so that the end user may determine geometric parameters from an image based on the determined calibration values.

For example, the end user uses the device 801 to display an image of a road 817. The image is captured by a camera having the determined calibration values. Then the end user can select regions, geographic objects, or points to determine distance values. For example, the end user may be interested in the width of a road lane in the image. Accordingly, the end user selects point 823 and point 825 or selects or draws line 821. The application on the device 801 uses the determined calibration values to calculate the real-world distance value 821, which corresponds to the lane width. The determined geometric parameter value may be displayed on the image or in a separate window.

Alternatively, the end user may be able to collect his or her own images via a camera associated with the device 801. Calibration values of the camera in a set position and/or orientation may be determined as described above. Accordingly, the end user may be able to determine geometric parameters from a single image of self collected images.

Furthermore, as described above, the collection of images occurs about or around roads or paths. In an alternate embodiment, images may be collected in any region or area, such as areas not associated with predetermined or fixed paths or roads. For example, images may be collected over different parts of an open area having no set paths.

The logic, software, or instructions for implementing the processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts, steps, or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

It is intended that the foregoing detailed description be regarded as illustrative rather than limiting and that it is understood that the following claims including all equivalents are intended to define the scope of the invention.

We claim:

1. A method of determining a geometric parameter of a region from an image, wherein the image is collected to develop a navigation database, the method comprising:
 determining calibration values corresponding to a camera mounted on a vehicle;
 capturing a plurality of images of geographic features, the plurality of images captured by the camera mounted on the vehicle;
 identifying a single image from the plurality of images;
 calculating a vector from a center of the camera through a point in a single image;
 calculating an intersection of a ground plane and the vector from the center of the camera through the point in the single image; and
 determining a geometric parameter of a region in the single image based on the determined calibration values and the intersection of the ground plane and the vector from the center of the camera through the point in the single image, wherein the geometric parameter is a real-world distance.

2. The method of claim 1, wherein the real-world distance comprises a ground distance.

3. The method of claim 2, wherein the ground distance comprises a width or length of an object in the region represented in the single image.

4. The method of claim 3, wherein the object comprises a road lane or a lane marking.

5. The method of claim 1, wherein the real-world distance comprises a height.

6. The method of claim 5, wherein the height comprises a height of a road sign.

7. The method of claim 1, wherein the calibration values include a focal length of the camera and a camera roll angle.

8. The method of claim 1, further comprising: storing the determined geometric parameter in the navigation database.

9. The method of claim 1, wherein determining the calibration values comprises projecting a three-dimensional ground coordinate system from an image plane.

10. The method of claim 9, wherein real-world ground points represented in the three-dimensional ground coordinate system are modeled as a function of an intrinsic value of the camera and an extrinsic value of the camera.

11. The method of claim 10, wherein the calibration values are determined based on comparing a real-world measurement between the real-world ground points and a computed measurement between the real-world ground points.

12. A method of determining a real-world parameter of an object in an image, the method comprising:
 determining calibration values relating to a camera, wherein the camera captures an image at the determined calibration values;
 identifying a first point in the image;

identifying a second point in the image, wherein the first point and the second point correspond to endpoints of an object in the image;

identifying a ray from a camera center to the image;

determining a distance between the first point and the second point in the image based on the determined calibration values and the ray from the camera, the distance corresponding to a real-world length or a real-world width of the object in the image.

13. The method of claim 12, wherein the object comprises a road lane, a road marking, a road sign, or portions thereof.

14. The method of claim 12, wherein the calibration values include a focal length of the camera and a camera roll angle.

15. The method of claim 12, wherein determining the distance comprises entering the calibration values into mathematical models representing the first point and the second point in a three-dimensional ground coordinate system, the three-dimensional ground coordinate system generated as a function of an image plane.

16. A non-transitory computer-readable medium configured to store a computer program that performs a method of determining a real-world ground parameter from a single image, the method comprising:

identifying an image captured by a camera;

identifying calibration values associated with the camera, the identified calibration values including a determined extrinsic value and a determined intrinsic value of the camera at the time the single image was captured;

calculating a vector through a vanishing point in the single image; and determining a real-world ground parameter of a region in the single image based on the identified calibration values and the vector through the vanishing point in the single image, the real-world ground parameter including a ground distance value.

17. The non-transitory computer readable medium of claim 16, wherein the determined extrinsic value includes a camera roll angle and the determined intrinsic value includes a focal length of the camera.

18. The non-transitory computer-readable medium of claim 16, wherein the ground distance value comprises a length or width of a feature on a road.

19. A device for determining a real-world geometric parameter from a single image, the device comprising:

a user interface configured to display an image captured by a camera;

a processor in communication with the user interface and configured to calculate a vector from the camera through a point in the image;

a memory in communication with the processor, the memory configured to store data of the image and data of a determined calibration value of the camera, wherein an image is displayed on the user interface, and wherein the processor is configured to determine a geometric parameter of a region represented in the displayed image based on the determined calibration value and the vector from the camera through the point in the image, the geometric parameter being a value representing a real-world distance between selected points in the displayed image.

* * * * *